UNITED STATES PATENT OFFICE.

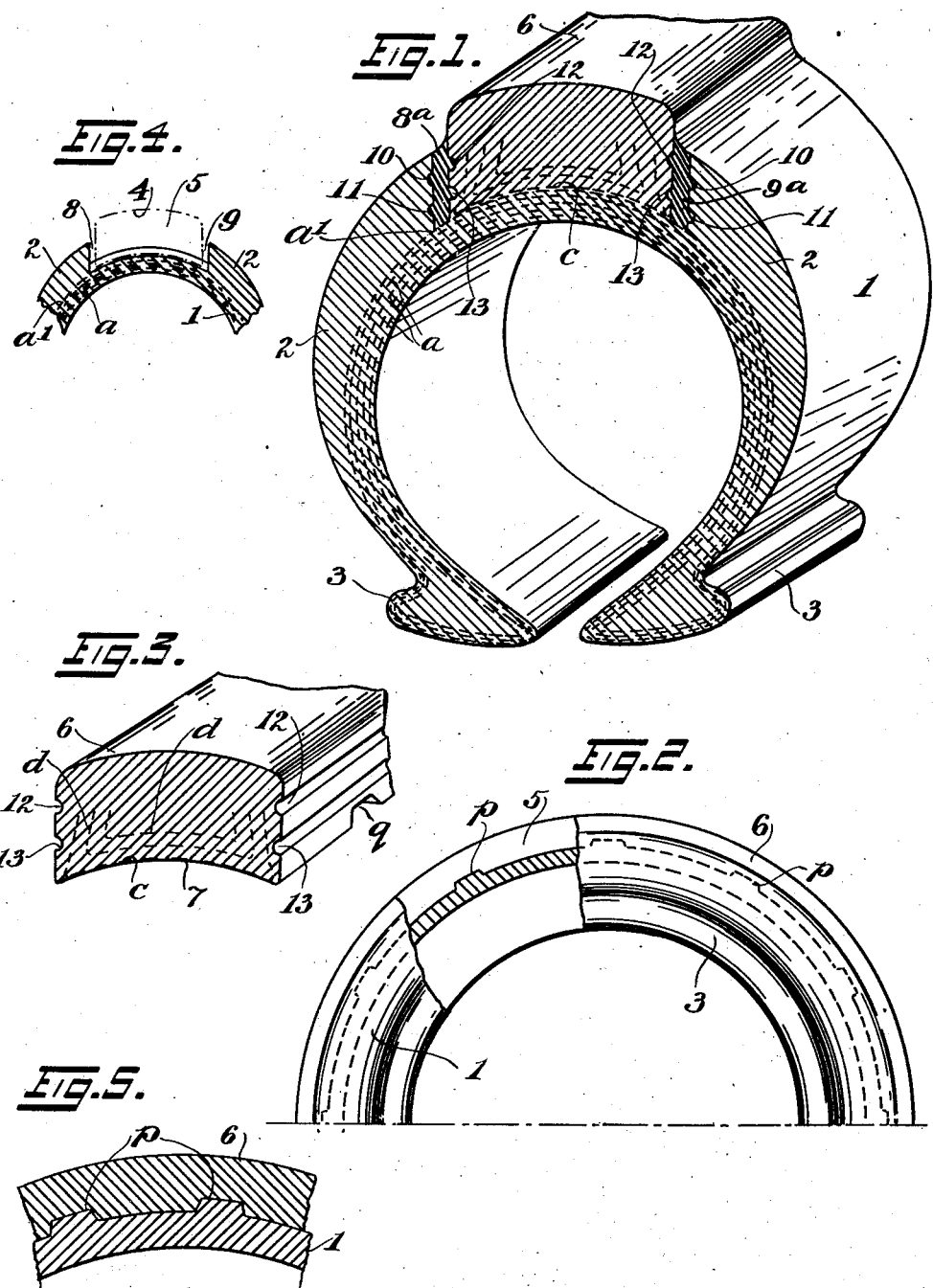

FREDERICK U. ADAMS, OF HASTINGS-UPON-HUDSON, NEW YORK.

VEHICLE-TIRE.

1,152,470.   Specification of Letters Patent.   Patented Sept. 7, 1915.

Application filed May 13, 1914. Serial No. 838,199.

*To all whom it may concern:*

Be it known that I, FREDERICK U. ADAMS, a citizen of the United States, residing in Hastings-upon-Hudson, in the county of Westchester and State of New York, have invented certain new and useful Improvements in Vehicle-Tires, of which the following is a specification.

My present invention relates to resilient tires for vehicles and more specifically to an improvement in the structure of pneumatic or solid tires and the provision for re-treading the same, which will hereinafter be more fully disclosed.

Figure 1 is a sectional view of a shoe; Fig. 2 is a side elevation of the same, reduced; Fig. 3 is a perspective of a portion of the tread member shown in section; Fig. 4 is a fragmentary section of the shoe with the tread member removed, and Fig. 5 is a fragmentary sectional view showing anti-creeping engagement means between the tread portion and the shoe.

In Fig. 1, there is disclosed a tire casing 1 of the so-called pneumatic type, and the same is shown as being constructed of a plurality of plies of fabrics $a^1$, $a$, $a$ and $a$, which form the inner wall thereof, are cemented together in the well known manner, and are extended down and cored in the usual manner so as to form the bead or clencher portions 3. In so far as the structure is here disclosed, it will be noted that it is similar to that of the well known structure of casings of this type. Additional to this, however, I provide an outer rubber cover portion 2 which, when vulcanized, is so conformed as to leave a channel or seat 5 in the tread portion 4 of the said tire. This channel 5 is so molded into the tire that the outermost wall of the fabric $a^1$ is exposed therein as shown in Fig. 4. The tire is then vulcanized in the usual manner. Into the channel 5 there is fitted a resilient rubber tread portion 6, Fig. 3, which tread portion is composed of a ply or plies of fabrics $c$ and $d$, which are molded and vulcanized in the interior of and on the inner surface of the said tread portion. It will be noted that the face 7 of the tread portion is formed by fabric $c$ and this fabric is exposed similarly to the fabric $a^1$ in the bottom of channel 5. I prefer to have the fabric exposed in the aforesaid manner in order to furnish two surfaces which will receive and properly maintain the cement that binds them together. Any desirable cement that will maintain the tread portion in operative position with the body portion 1, may be used, but preferably a cement that will bind the two fabric surfaces together in such a manner as to permit the stripping apart thereof for the purpose of replacement. Certain forms of flexible glue might be used, and in this case protection must be afforded against deterioration or looseness through an attack by moisture.

The preferred method of protecting the cemented or glued surfaces from attack by moisture and other deteriorating influences is as follows: As indicated in Figs. 1 and 4 the removable tread member does not quite fill the channel 5 and is centrally located so as to leave on its opposite sides clearances 8 and 9. These clearances 8 and 9 are thereupon filled with unvulcanized rubber and are returned to another mold and the unvulcanized rubber is vulcanized into the clearances 8 and 9, forming fillets, as indicated at $8^a$ and $9^a$, Fig. 1. As is obvious, this will then form practically a continuous connection between the side walls of the channel 5 and the side walls of tread member 6, thereby making the joints between the shoe and tread member water tight and practically integral. As a means for insuring a better bond between the said tread member and the shoe member there may be arranged grooves 10 and 11 and 12 and 13 on the shoe and tread members, respectively. This permits the fillet members $8^a$ and $9^a$ to be formed into a sort of interlock between the side walls as before mentioned.

After the tread member 6 has become so worn from use that a new tread is required the old tread member may be stripped from the channel, together with the fillet pieces $8^a$ and $9^a$, and a new tread member placed therein and the process of cementing and vulcanizing-in of the said fillet pieces repeated.

As an extra means for retention of the tread member 6 in its proper relation to the rest of the shoe, and as a means to prevent the creeping of the tread member and to absorb circumferential driving stresses, I provide, in the said channel member 5, a plurality of projections $p$ and in the tread portion 6 corresponding depressions $q$ which fit the members $p$. It is obvious that this construction may be reversed and the depressions arranged in the channel portion and the projections on the tread portion. As a further precaution against creeping of the tread member, owing to possible disintegration of the cement, it may be made in such a manner that its inside diameter is smaller than the overall diameter of the channel in which it fits, so that when the assembled tire is inflated, the tread portion is held in firm engagement with the tire body, by reason of the stress between the slightly undersized tread member and the slightly expanded tire proper.

Having thus described my invention I claim:

1. A vehicle shoe comprising a rubber body portion having a fabric reinforcement therein, a channel in the tread portion thereof, the walls of said channel being formed by the rubber body portion, the base of said channel being formed by the said fabric portion, a removable tread portion cemented in said channel, said tread portion having a fabric and rubber body portion, part of said fabric forming the base of said tread portion and affording means for cementing said tread in said channel.

2. A vehicle shoe comprising a channeled rubber body portion, having a fabric reinforcement therein, and an annular removable tread member in said channel, said tread member being comprised of rubber reinforced by fabric and being cemented in said channel fabric to fabric.

3. A vehicle shoe comprising a reinforced rubber body portion, a tread seat molded in said body portion, an annular reinforced resilient removable tread member in said seat, said tread member being smaller in width than the seat in said body portion leaving a clearance between the side walls of said tread member and said body portion, and a filler in said clearance, said filler being vulcanized to said walls thereby binding said tread member to said body portion.

4. A vehicle shoe comprising a reinforced rubber body portion, a tread seat molded in said body portion, an annular reinforced resilient removable tread member in said seat, said tread member being smaller in width than the seat in said body portion leaving a clearance between the side walls of said tread member and said body portion, a filler in said clearance, there being annular grooves in the opposing side walls of said tread member and said body portion, and annular ribs on said filler disposed in said annular grooves.

5. A vehicle shoe comprising a reinforced rubber body portion, a tread seat molded in said body portion, an annular reinforced resilient removable tread member in said seat, said tread member being smaller in width than the seat in said body portion leaving a clearance between the side walls of said tread member and said body portion, a filler in said clearance, there being annular grooves in the opposing side walls of said tread member and said body portion, and annular ribs on said filler disposed in said annular grooves, said filler being vulcanized to said walls thereby binding said tread member to said body portion.

6. A vehicle shoe comprising a rubber body portion, a channel in the tread portion thereof, a tread member arranged in said channel portion, said channel being wider than the width of said tread thereby leaving a clearance between the walls of said tread member and the walls of said channel, and a rubber filler in said clearance, said filler being vulcanized to said walls thereby binding the said tread member to the said body portion.

FREDERICK U. ADAMS.

Witnesses:
H. D. PENNEY,
JOHN MORRIS.